May 11, 1943.　　S. W. MANSELL ET AL　　2,319,146
REDUCTION GEARING FOR AIRCRAFT PROPELLERS
Filed Jan. 30, 1942　　3 Sheets-Sheet 1

Inventors
S. W. Mansell
and W. P. Holloway
by Wilkinson & Mawhinney
Attorneys.

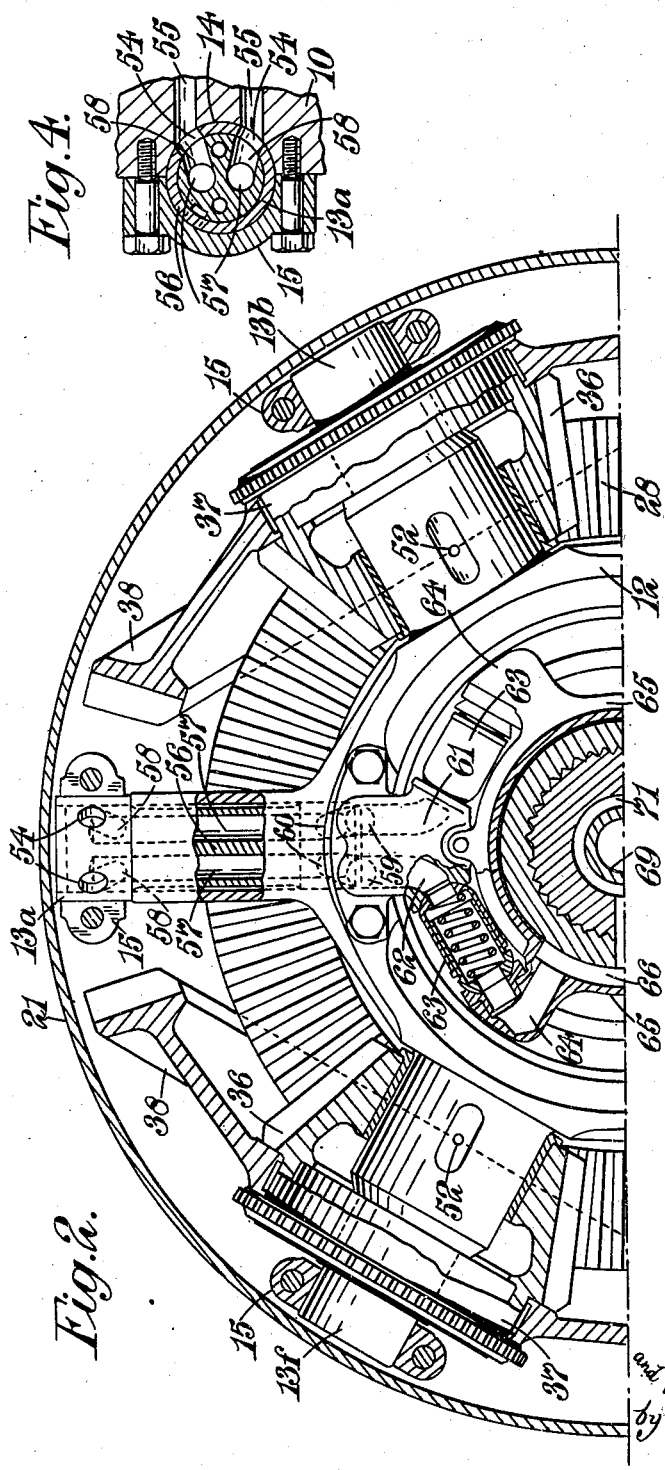

May 11, 1943.   S. W. MANSELL ET AL   2,319,146
REDUCTION GEARING FOR AIRCRAFT PROPELLERS
Filed Jan. 30, 1942   3 Sheets-Sheet 3
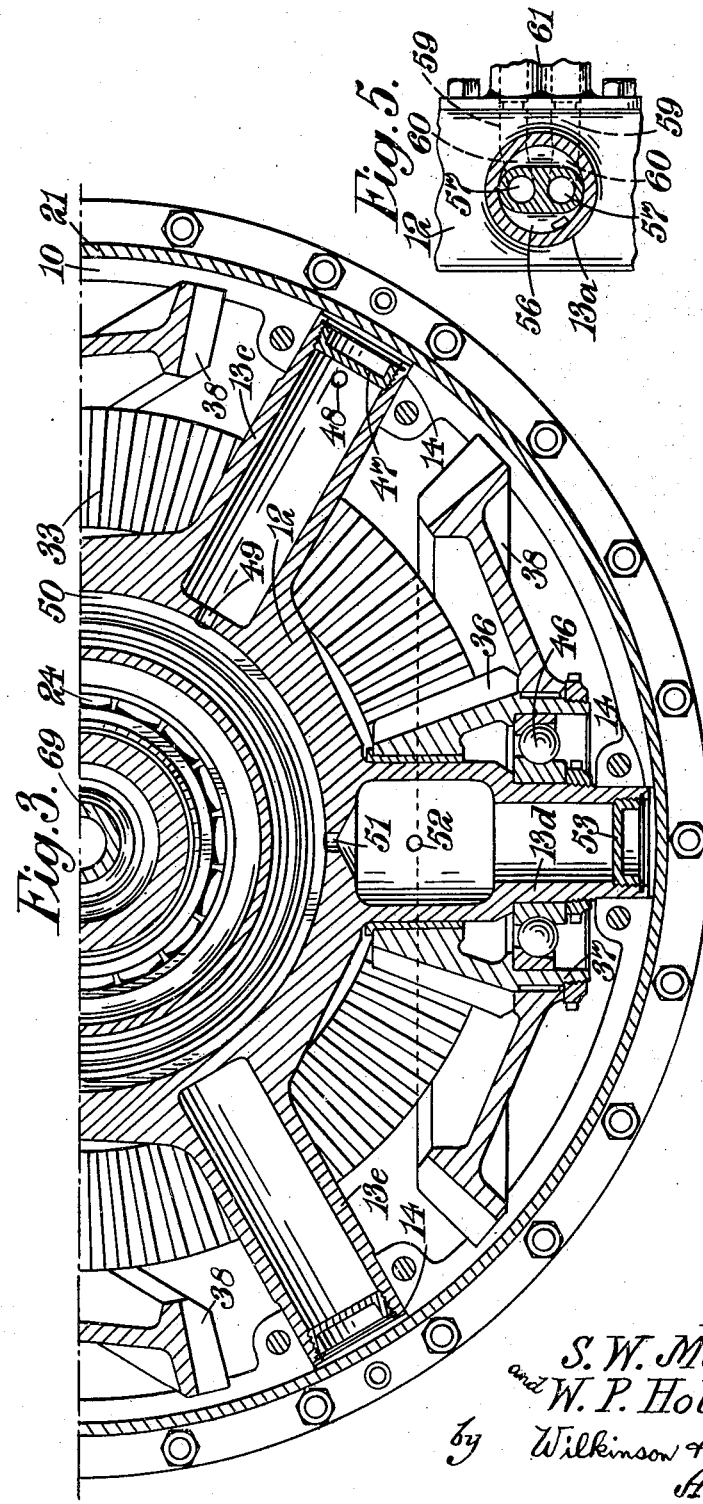
Inventors
S. W. Mansell
and W. P. Holloway
by Wilkinson & Mawhinney
Attorneys.

Patented May 11, 1943

2,319,146

UNITED STATES PATENT OFFICE 2,319,146

REDUCTION GEARING FOR AIRCRAFT PROPELLERS

Stanley Walter Mansell and Wilfrid Payne Holloway, Bristol, England, assignors to The Bristol Aeroplane Company Limited, Bristol, England, a company of Great Britain Application January 30, 1942, Serial No. 428,962
In Great Britain February 17, 1941

2 Claims. (Cl. 74—389)

The present invention relates to reduction gearing for aircraft propellers which are co-axially mounted and are adapted to be rotated in opposite directions.

The invention has for its object to provide a fixed-ratio reduction-gearing in which the reduction and contra-rotation are effected by the same gears. This results in a reduction in the overall dimensions of the gearing, especially in the length whereby the undesirable effects due to the overhanging weight of airscrews and their associated mechanism are minimised.

According to the present invention a fixed-ratio reduction gear for driving counter-rotating airscrews from an engine in an aircraft comprises a bevel-pinion adapted to be driven by the engine, a pair of bevel-wheels meshing with the bevel-pinion at diametrically opposite points and a pair of coaxial nested airscrew-shafts each secured to, and supporting, a separate one of the bevel-wheels and adapted to support and drive a separate one of the airscrews, whereby the reduction, or a part thereof, and the counter-rotation are both effected by the said pinion and wheels. In order that the airscrew-shafts may be coaxial with the engine crankshaft, there may be provided a third bevel-wheel coaxial with, and coupled to, the bevel-pinion and an engine-driven bevel-wheel coaxial with the airscrew-shafts, meshing with the third bevel-wheel and adapted to be driven by the engine crankshaft. Preferably the bevel pinion and coupled bevel-wheel are duplicated symmetrically around the airscrew-shafts in order to reduce the tooth-widths of the wheels and pinions by dividing the driving torque.

According to a feature of the invention there is provided a spider having a hub forming a bearing for the rear end of one of the airscrew-shafts and arms, some, at least, of which constitute each the support for one of the bevel-pinions and the coupled bevel-wheel, and which are adapted each to be secured at its outer end to a fixed part of the engine.

With airscrews of the hydraulically-operated variable-pitch type, it is the practice to provide the inner airscrew-shaft with two conduits for conveying liquid to an hydraulic pitch-varying mechanism, and it is a feature of this invention to form one arm of the spider of the reduction gear, when it is used to drive airscrews of this type, with a pair of ducts communicating respectively with the conduits in the inner airscrew-shaft and adapted to register each with a separate conduit in a fixed part of the engine so that the liquid for operating the pitch-varying motor is conveyed to it through the reduction gear.

A reduction gear, in accordance with this invention, for counter-rotating airscrews will now be described, by way of example only, with reference to the accompanying drawings in which:

Figure 2 is a section on the line 2—2 of Figure 1 through the upper part of the gear;

Figure 3 is a section on the line 3—3 of Figure 1 through the lower part of the gear;

Figure 4 is a section on the line 4—4 of Figure 1, and

Figure 5 is a section on the line 5—5 of Figure 1.

Figure 1:
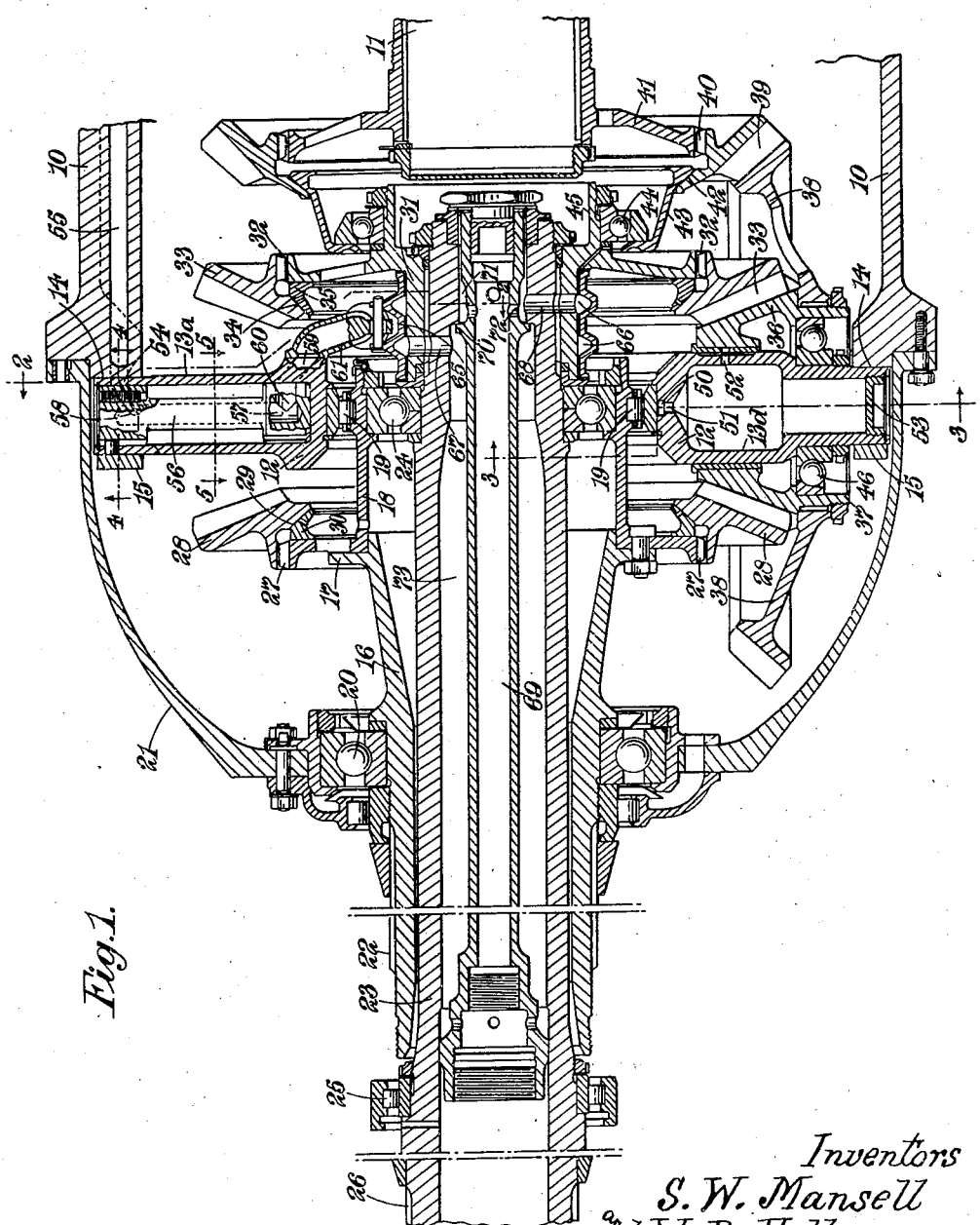
Figure 1 is a vertical section through the gear in the plane containing the axis of rotation of the airscrews.

As shown in Figure 1 the crankcase of an engine has a cylindrical extension 10 into which the front end of the engine crankshaft 11 projects. A spider is mounted on the front end of this extension and comprises a hub 12 from which six arms 13a to 13f extend radially as shown in Figures 2 and 3. The outer end of each arm is received in a recess 14 in the extension 10 and is clamped to the extension by a part 15 bolted to the extension. The rear end of an outer airscrew-shaft 16 has a flange 17 which is bolted to a hub 18. This hub is supported in the hub 12 of the spider by a roller bearing 19. The shaft 16 is also supported by a ball bearing 20 carried by a gear-cover 21 which is bolted to the extension 10 and closes the open end of the extension. The rear airscrew, not shown, is mounted on the front end of the shaft 16 which drives it by means of splines 22. An inner airscrew-shaft 23 extends through the shaft 16 and is supported at its rear end by a ball bearing 24 mounted between it and the hub 18. The front end of the inner shaft 23 is supported by a roller bearing 25 which fits within the hub of the rear airscrew. The front airscrew is mounted on the front end of the shaft 23 and is driven by splines 26. The shafts 16 and 23 are coaxial with the crankshaft 11.

The hub 18 has splines 27 engaging splines on a bevel-wheel 28 which has a spherical surface 29 engaging a similar surface on a seating ring 30. A hub 31 is splined on the rear end of the shaft 23 and has splines 32 engaging with similar splines on a bevel-wheel 33 which has a spherical surface 34 engaged with a similar surface on a seating ring 35. The bevel-wheels 28 and 33 mesh, at diametrically opposite points, with three bevel-pinions 36 which are mounted to rotate on the arms 13b, 13d and 13f of the spider (see Figures 2 and 3), these arms being shaped to form plain bearings for the bevel-pinions. Each bevel-pinion 36 has a skirt 37 and a thrust ball bearing 46 is mounted between this skirt and the arm 13b, 13d or 13f. Another bevel-wheel 38 is splined on the skirt 37 of each pinion 36 and each of these wheels meshes with an engine-driven bevel-wheel 39. The engine-driven wheel 39 has splines 40 which engage similar splines on a hub 41 which, in turn, is splined on the crankshaft 11 and the wheel 39 has a spherical surface 42 engaged with a similar surface on a seating ring 43. A thrust ball bearing 44 is mounted between the seating 43 and a skirt 45 on the hub 31 and the axial load on the bevel-wheel 39, tending to move it to the right in Figure 1, is transmitted through the seating ring 43 and the ball bearing 44 to the hub 31 and the inner shaft 23. It will be seen that the crankshaft drives the pinions 36 through the wheel 39 and the wheels 38, the gear ratio being substantially one-to-one. The pinions 36 drive the wheels 28 and 33 in opposite directions at a reduced speed and thus drive the airscrew-shafts 16 and 23 to which the latter wheels are secured.

It has been explained how the axial load on the wheel 39 is transmitted to the shaft 23. The axial load on the wheel 33 will also be transmitted to this shaft since the wheel is secured rigidly on the shaft. The axial load on the wheel 28 is also transmitted to the shaft 23 through the ball bearing 24 which is a thrust bearing. These loads are thus balanced against one another and their resultant is transmitted through the ball bearing 20 to the cover 21. The bearings 20 and 24 also serve to transmit the thrust of the airscrews to the cover 21 and hence to the aircraft in which the engine is mounted. The spherical seating rings 30, 35 and 43 permit the bevel-wheels 28, 36 and 39 to rock to equalise the tooth pressures at the three points where they each mesh with the pinions 36 or wheels 38 so that the driving torque is equally distributed between the three wheels 38 and coupled pinions 36. The use of three pinions 36 and wheels 38 divides the driving torque and permits of wheels of smaller tooth width being used. The axial loads on the pinions 36 and wheels 38 are transmitted to the spider by the ball bearings 46 and balanced against one another.

It will be noticed that the gear can be removed from the engine as a unit by removing first the cover 21 and then the spider. Both the airscrew-shafts and the whole of the gear, including the wheel 39, will come away as a unit with the spider. The hub 41 will be left on the crankshaft 11.

The bearing surfaces of the pinions 36 are lubricated in the following manner. The arm 13c (Figure 3) is tubular and its outer end is closed by a plug 47. This arm is formed with a hole 48 to register with a duct formed in the crankcase extension 10 and oil is fed to this duct from the engine lubrication system. The interior of the arm 13c communicates through a hole 49 with a channel 50 cut in the hub 12 of the spider. This channel also communicates through holes 51 with the interiors of the arms 13b, 13d and 13f. The open outer ends of these three arms are closed by plugs 53 and the oil escapes from them through holes 52 to the bearing surfaces for the pinions 36.

Provision is made for supplying oil to operate a pitch-varying motor (not shown) mounted in the normal manner on the front end of the inner shaft 23. The arm 13a is formed with two holes 54 (Figures 1 and 4) to register with two ducts 55 formed in the extension 10. A plug 56 is inserted into the arm 13a and is formed with two ducts 57 having lateral passages 58 to register with the ducts 55. The ducts 57 are drilled from the top of the plug and their upper ends are plugged up. The ducts 57 also have lateral passages 60 at their lower ends to communicate with passages 59 in the arm 13a. The plug 56 is formed with a keyway to engage a suitable pin in the arm 13a and locate the plug in correct position for the various passages and holes to register. The passages 59 communicate with ducts formed in an elbow 61, the lower outlets 62 of the elbow being oppositely directed as shown in Figure 2. Each outlet 62 is connected to a separate elbow 64 by a short telescopic tube 63 which is extended by an internal spring. Each elbow 64 projects from a ring 65 and communicates with a separate groove 66 on the inner surface of the ring. The ring is a running fit on the hub 31 which rotates within it. A tube 69 is secured in the inner shaft 23 and has a flange 70 which isolates a space 71 from the rest of the annular space between the tube and the shaft 23. The space 71 communicates through openings 72 with the interior of the tube 69 and also through a passage 68 in the shaft 23 and hub 31 with one of the grooves 66. The space 73 outside the tube 69 communicates through a passage 67 in the shaft 23 and hub 31 with the other groove 66. Thus oil under pressure can be admitted through one of the ducts 55, one of the ducts 56 and one of the grooves 66 to the space 73 and hence to the pitch-varying motor to cause it to vary the pitch of the airscrews in one sense, or through the other of the ducts 55, the other duct 57 and the other groove 66 to the interior of the tube 69 and hence to the pitch-varying motor to operate it to vary the pitch of the airscrews in the opposite sense.

In the arrangement shown in the drawings, the whole of the speed reduction is effected by the pinions 36 and wheels 28 and 33. If desired, part of the reduction may be effected by the wheels 38 and 39 but it is not thought that any advantage would be gained in so doing. The arms 13a, 13c and 13e are not structurally essential and could be omitted. Their principal function is to provide increased support for the spider and the parts it supports.

We claim:

1. A fixed ratio reduction gearing for driving counter-rotating coaxial airscrews from an engine in an aircraft, comprising a stationary spider having a hub and a plurality of arms, a pair of coaxial nested airscrew-shafts of which the outer is journalled at one end to rotate in the hub of the spider, a pair of bevel-wheels arranged one on either side of the spider and secured one to each airscrew-shaft, a plurality of bevel-pinions each meshing with both of the bevel-wheels and each rotatable on a different arm of the spider, an additional bevel-wheel rotatable with each bevel-pinion, an engine-driven bevel-wheel coaxial with the airscrew-shafts and meshing with all the additional bevel-wheels, a radial and thrust bearing between the inner and outer airscrew-shafts at the end of the latter that is journalled in the hub of the spider, a cover for the gearing, a radial and thrust bearing supporting the outer airscrew-shaft and carried by the cover at a position spaced from the spider and a radial bearing carried by the inner airscrew-shaft beyond the end of the outer shaft that is remote from the spider and in position to engage the hub of an airscrew on the outer shaft.

2. A reduction gearing according to claim 1, comprising means which supports the engine-driven bevel-wheel on the inner airscrew-shaft and transmits the axial load on that wheel to that shaft and a hub adapted to be secured on the engine crankshaft, and to make driving engagement with the engine-driven bevel-wheel.

STANLEY WALTER MANSELL.
WILFRID PAYNE HOLLOWAY.